United States Patent [19]

Shirai

[11] 4,187,755
[45] Feb. 12, 1980

[54] APPARATUS FOR CUTTING SHEET GLASS

[76] Inventor: Kazuya Shirai, No. 5-21, 3-chome, Kashitanishi, Higashiosaka-shi, Osaka, Japan

[21] Appl. No.: 894,851

[22] Filed: Apr. 10, 1978

[30] Foreign Application Priority Data

Apr. 15, 1977 [JP] Japan .............................. 52-49497[U]

[51] Int. Cl.² .......................... B26D 3/08; C03B 33/02
[52] U.S. Cl. ...................................... 83/882; 83/487; 83/508.1; 83/614; 83/884
[58] Field of Search ................. 83/882, 884, 883, 864, 83/508.1, 485, 487, 614

[56] References Cited

U.S. PATENT DOCUMENTS

| | | | |
|---|---|---|---|
| 621,965 | 3/1899 | Jordan | 83/882 |
| 3,183,747 | 5/1965 | Insolio | 83/487 X |
| 3,198,044 | 8/1965 | Clin | 83/882 |
| 3,274,390 | 9/1966 | Umbel | 83/883 X |
| 4,098,155 | 7/1978 | Insolio | 83/485 X |

FOREIGN PATENT DOCUMENTS 45-10074 11/1970 Japan .......................................... 83/884

*Primary Examiner*—Frank T. Yost
*Attorney, Agent, or Firm*—George B. Oujevolk

[57] ABSTRACT

An apparatus for cutting sheet glass which can not only cut a glass sheet into several smaller sheets of different sizes by a single operation but also can form cutting lines on several glass sheets by superposing them one over the other in sequence without dismounting the preceding sheets from the cutting apparatus after forming cutting lines thereon so as to obtain several smaller sheets of different sizes from each large glass sheet, and also a cutter which inhibits the formation of jagged irregularities on the cut faces of the smaller sheets when separated along the cutting lines.

7 Claims, 11 Drawing Figures

APPARATUS FOR CUTTING SHEET GLASS

The present invention relates to an apparatus for cutting sheet glass, and more particularly to a sheet glass cutting apparatus which can not only cut a large-sized glass sheet into several smaller sheets of different sizes by a single operation but also can form cutting lines on several glass sheets by superposing them one over the other in sequence without dismounting the preceding sheets from the cutting apparatus after forming cutting lines thereon to obtain several smaller sheets of different sizes. The invention also relates to a cutter which inhibits the formation of jagged irregularities on the cut faces of the smaller sheets when separated along the cutting lines.

A first object of the invention is to provide a sheet glass cutting apparatus which can cut a large-sized glass sheet into several smaller sheets of different sizes by a single operation.

A second object of the invention is to provide a sheet glass cutting apparatus which can form cutting lines on several glass sheets by superposing them one over the other consecutively without dismounting the preceding sheets from the cutting apparatus after forming cutting lines thereon to obtain several smaller sheets of different sizes.

A third object of the invention is to provide a cutter which prevents the formation of jagged irregularities on the cut faces of the smaller sheets when separated along the cutting lines.

A further object of the invention is to provide a sheet glass cutting apparatus simple in construction and convenient to handle.

Other objects and advantages of the invention will become apparent from the following description taken in connection with the accompanying drawings, in which.

The same reference numerals designate the same or similar parts throughout the drawings.

First Embodiment

Figure 1:
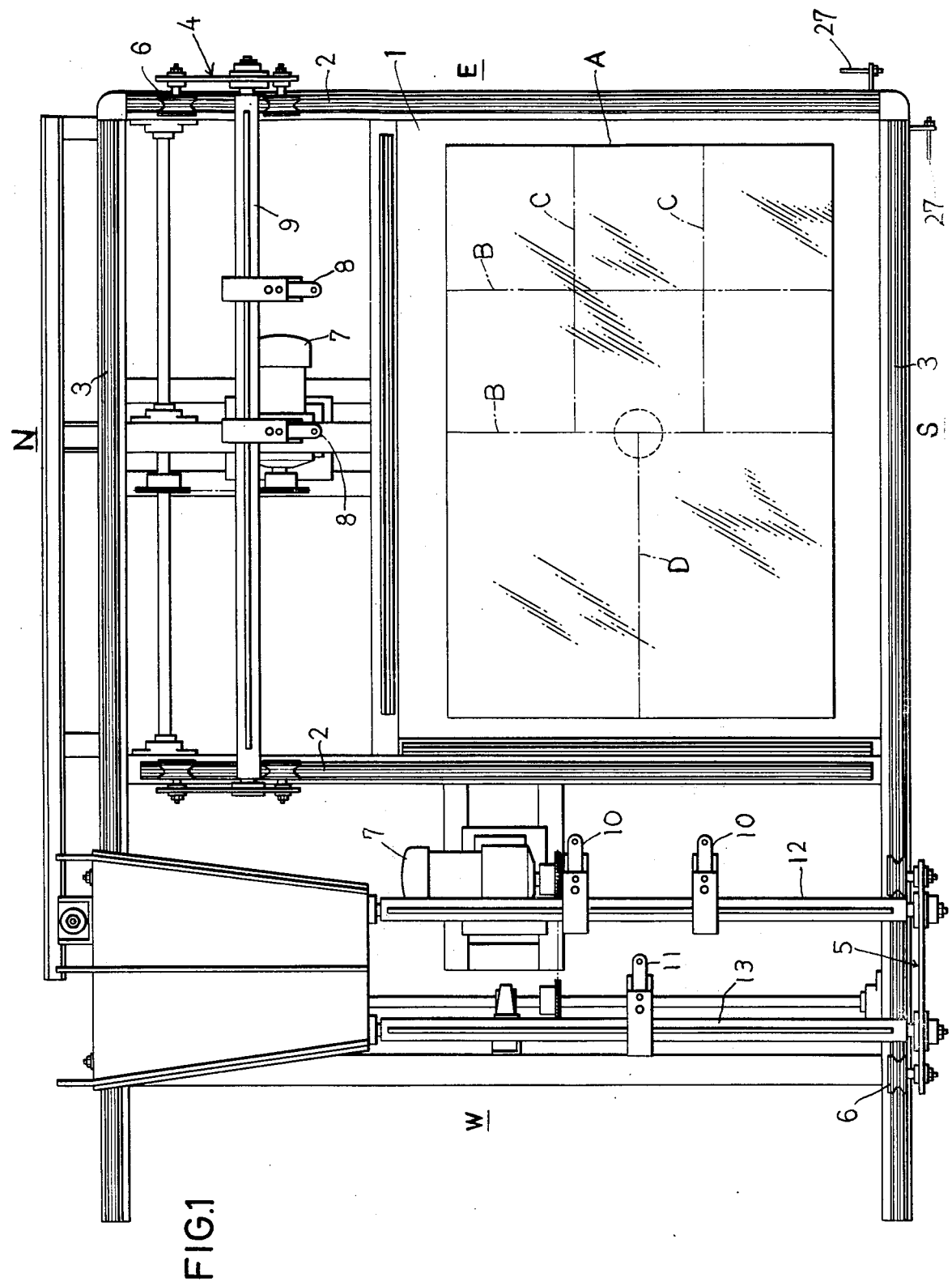
FIG. 1 is a plan view of the cutting apparatus according to the invention.
Figure 2:
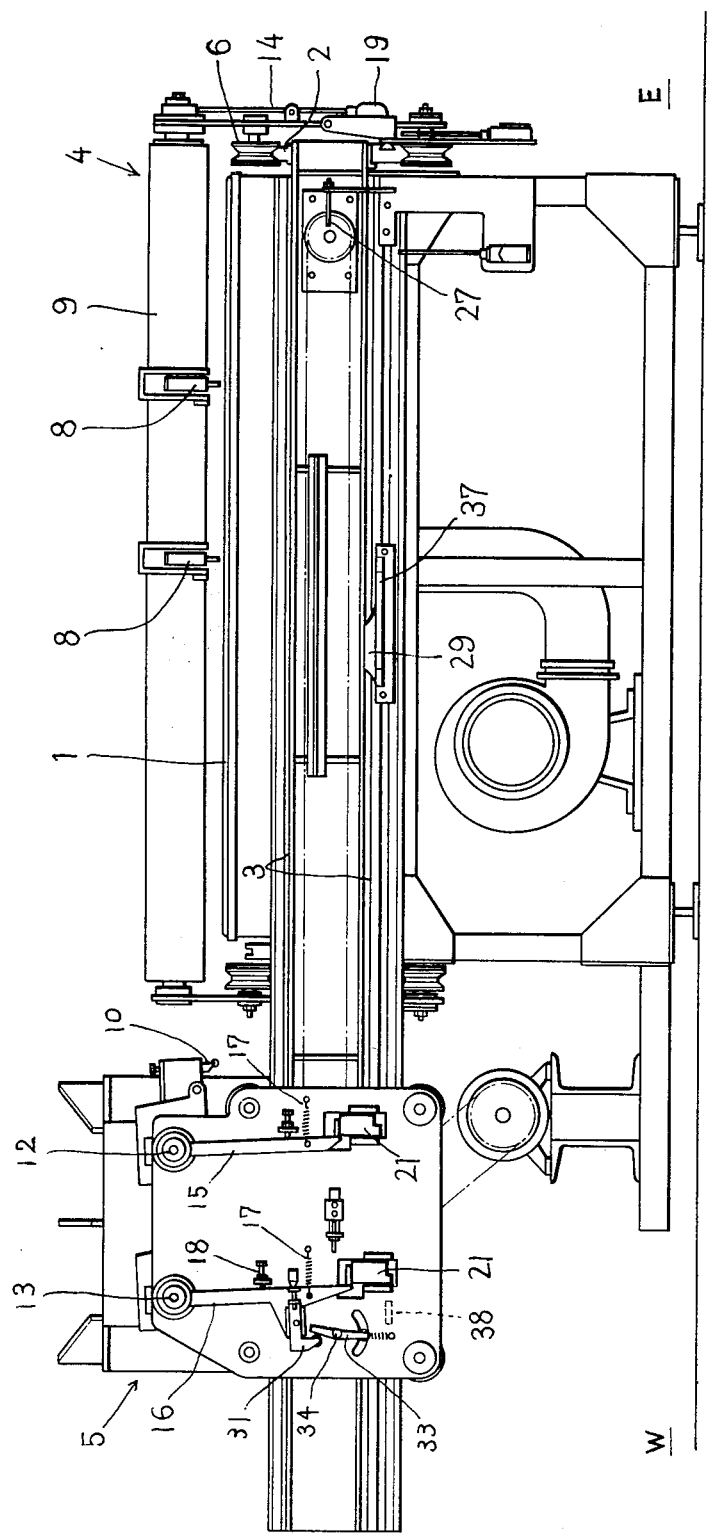
FIG. 2 is an elevational view of the same.

Referring to FIGS. 1 and 2, the sheet glass cutting apparatus according to the invention comprises a table on which to place a glass sheet to be cut, a first carriage having cutters and capable of travelling along the longitudinally opposite sides of the table, and a second carriage having cutters and capable of travelling along the transversely opposite sides of said table.

In the drawings, the numeral 1 designates a table on which a glass sheet (A) to be cut is placed. The table 1 is provided with first rails 2, 2 mounted along the longitudinally opposite sides thereof and second rails 3, 3 along the transversely opposite sides thereof. The numeral 4 designates the first carriage capable of travelling along the first rails 2, 2, the numeral 5 designating the second carriage capable of travelling along the second rails 3, 3. FIG. 1 shows the respective positions of the carriages 4, 5 after completing the operation of forming cutting lines (B), (C), (D) on the glass sheet (A) placed on the table 1. A second glass sheet (A) is superposed on the first glass sheet (A) for forming the same cutting lines (B), (C), (D) thereon, and so forth, by the respective carriages 4, 5. The cutting operation is conducted substantially as follows.

The first carriage 4 is brought from its position shown in FIG. 1, that is, the position (N), to the position (S) along the first rails 2, 2, the cutters being lowered to their cutting positions, cutting lines (B) being formed on the glass sheet (A) by causing the first carriage 4 to travel to the position (N), whilst the second carriage 5 is sustained in its position shown in FIG. 1.

When the first carriage 4 has been brought back to its position shown in FIG. 1 after forming the cutting line (B) on the glass sheet (A), the second carriage 5 is brought from the position (W) to the position (E) along the second rails 3, 3, the cutters being lowered to their cutting positions, the cutting lines (C), (D) being formed on the glass sheet (A) by bringing back the second carriage 5 to the position (W). It must be noted that the second carriage 5 is so constructed as to be capable of overpassing the first carriage 4 in its travel along the second rails 3, 3.

The carriages 4, 5 travel on their wheels 6 along the rails 2, 3, respectively, actuated by drive means 7, such as motors and the like. The numeral 8 designates cutters provided on the first carriage 4, the cutters 8 being slidably secured to a shaft member 9 mounted rectangularly of the first rails 2.

The numerals 10, 11 designate cutters provided on the second carriage, the cutters 10, 11 being slidably secured to shaft members 12, 13.

The cutters 8, 10, 11 are secured to the shaft members in such manner that they are lowered to their cutting positions for forming cutting lines on the sheet glass when the respective carriage travel forward, that is, when the first carriage 4 travels from (S), to (N), while the second carriage 5 from (E), to (W) in FIG. 1, respectively. The cutter 11, in particular, is actuated starting from the cutting line (B) (the left one in FIG. 1) so as to form the cutting line (D), whereas the cutters 10 are raised on their arrival at the line (B) so as not to form cutting lines any farther beyond said line (B).

The means for raising and lowering the cutters 8, 10, 11 will be described in detail hereinunder with reference to FIGS. 2 to 5.

The shaft members 9, 12, 13 are rotatably pivoted on the respective carriages, levers 14, 15, 16 being secured at their upper ends to the pivotal parts. Each lever is provided with a spring 17 and normally biased by said spring 17 so as to engage with a stopper 18, as shown by the lever 16 in FIG. 3. Thus, the cutter 11 is kept spaced from the surface of the glass sheet (A).

Figure 5:
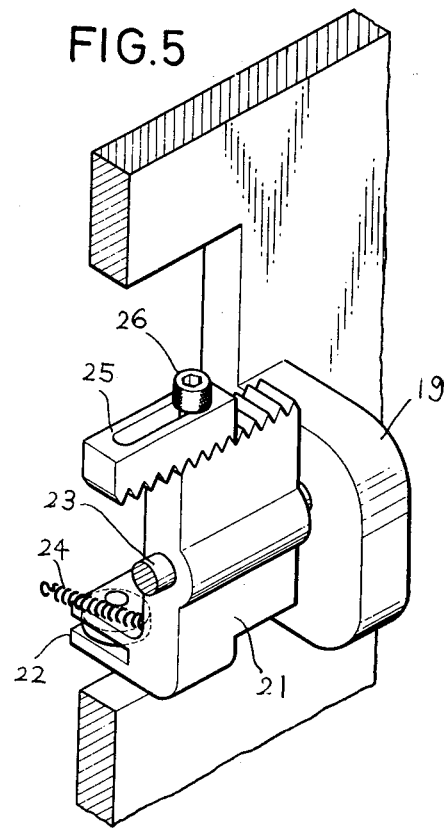
FIG. 5 is a perspective view, on a magnified scale, of the rotary piece 21 of FIG. 3.

Adjacent the lower end of each of the levers 14, 15, 16 are provided projecting pieces 19 on the side of the spring 17, a rotary piece 21 being rotatably pivoted in a notch 20 between said projecting pieces 19. As shown in FIG. 5, the rotary piece 21 is provided with a projecting part 22 and pivoted on the projecting pieces 19 by means of a pin 23. The rotary piece 21 is normally kept in a vertical position by a spring 24 provided thereon. When the rotary piece 21 is vertical, its upper edges engages with the side edge of the lever.

Figure 3:
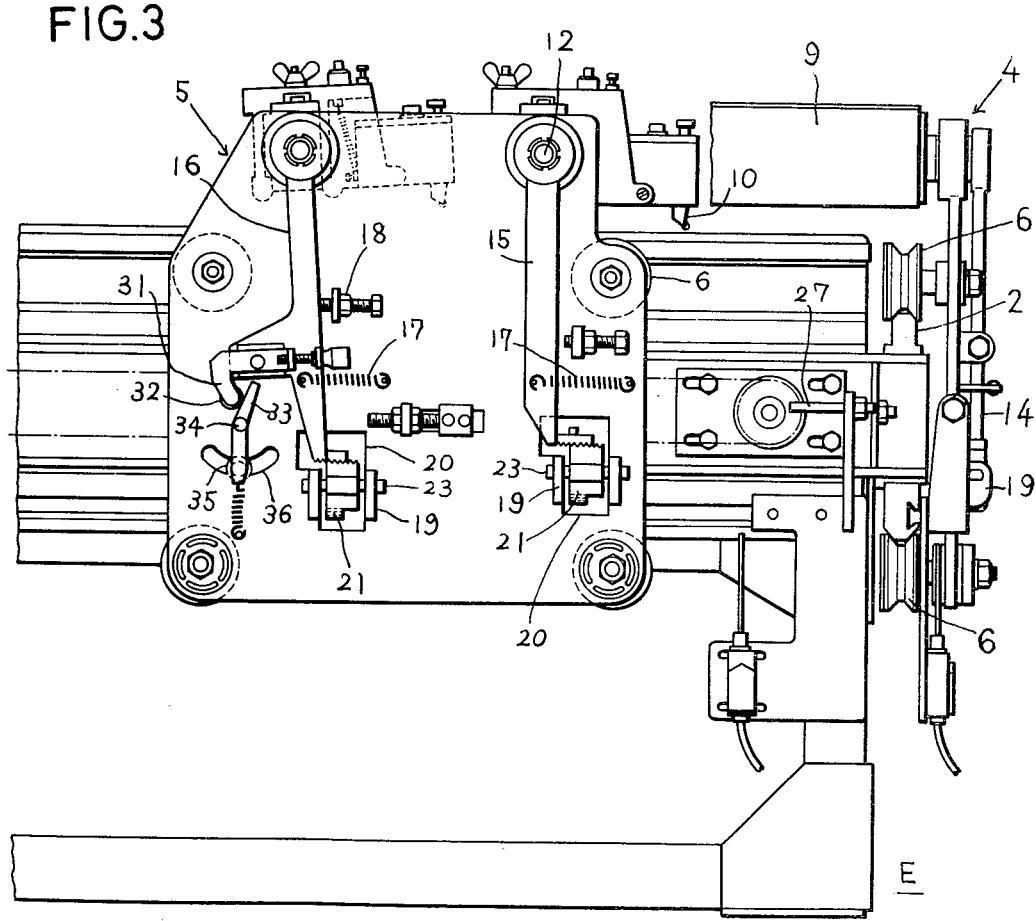
FIG. 3 is an elevational view, on a magnified scale, of the carriage of FIG. 2.

The numeral 25 in FIG. 5 designates a projecting piece for use in microadjustment of the contact position between the lever and the rotary piece, said projecting piece 25 being secured by a bolt 26. Since the vertical positions of the cutters 8, 10, 11 are variable by the amount of projection of the projecting piece 25, the cutters 8, 10, 11 can be microadjusted in accordance with the thickness of the glass plate to be cut. In FIG. 3, the lever 16 is brought into direct contact with the stopper 18 by the bias of the spring 17 since the rotary piece 21 is recessed inside the notch 20. Thus, the cutter 11 is kept in a raised position above the surface of the glass sheet (A).

Conversely, the lever 15 engages with the side edge of the rotary piece 21 projecting beyond the notch 20. Thus, the lever 15 is spaced from its stopper 18 thereby bringing the cutters 10 into contact with the surface of the glass sheet for forming cutting lines thereon.

Figure 4:
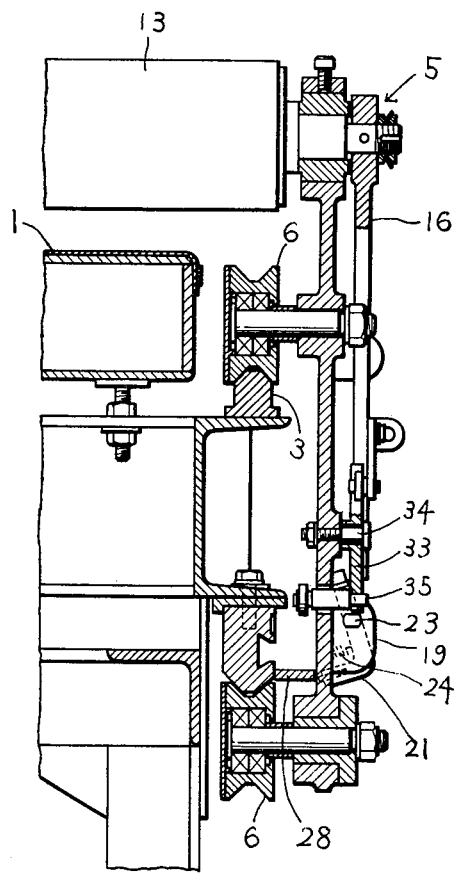
FIG. 4 is a side view of the same.

The mechanism of raising and lowering the cutters 10, 11 of the second carriage 5 from and to the surface of the glass sheet by projecting and recessing the top of the rotary piece 21 beyond and into the notch 20 will now be described in detail with reference to FIGS. 3 and 4.

A projecting axle 27 is provided at the end of the rail 2 on the side of (E), while a similar projecting axle 27 at the end of the rail 3 on the side of S. Thus, when the second carriage travels from (W) to (E), the projecting axle 27 is brought into contact with the lower end of the lever 15 thereby causing it to turn slightly against the spring 17 in the direction of (W). As a result, the top of the rotary piece 21 which has hitherto been pressed into the notch 20 against the spring 24 by the lower end of the lever 15 as shown by the broken lines in FIG. 4 is projected by said spring 24 into a vertical position. Thus, the lever 15 slightly oscillated by the projecting axle 27, even if biased by the spring 17 in the direction of the stopper 18 on separation of the second carriage from the projecting axle 27 in the direction of (W) from (E), is prevented from returning to the stopper 18 since it is now engaged with the top of the rotary piece 21.

Since the shaft member rotates in accordance with the movement of the lever 15, the cutters 10 are brought into contact with the surface of the glass sheet when the lever 15 is in the state of engagement with the rotary piece 21 so as to form the cutting lines (C) thereon. AS shown in FIG. 4, a cam 28 is provided on the rail 3 in order to move the top of the rotary piece 21 into the notch 20. When the lower projecting part of the rotary piece 21 is brought into contact with the cam 28, the rotary piece 21 rotates about a pin 23, and the top of the rotary piece 21 enters into notch 20.

As hereinbefore described, when the lever 15 is in the position (E) of the table and the top of the rotary piece engages with the side edge of the lever 15, the cutters 10 of the second carriage are brought into contact with the surface of the glass sheet for forming the cutting lines (C) thereon, whereas the lever 16 is kept in engagement with the stopper 18 by the spring 17, thus the cutter 11 of the shaft member 13 is kept in a raised position above the surface of the glass sheet. Therefore, as the second carriage 5 travels on the table from the position (E) toward the position (W), the cutting lines (C) are formed on the surface of the glass sheet by the cutters 10, while no cutting line is formed by the cutter 11 since it is spaced from the surface of the glass sheet, as shown in FIG. 1. When the cutter 11 of the second carriage 5 reaches the cutting line (B) (on the left side) during the travel of the carriage 5 from the position (E) toward the position (W), a roller 35 associated with the lever 16 is actuated by a first cam 29 (FIG. 2) provided on the second rail 3, whereby the lever 16 is pushed away from the stopper 18 and the shaft member 13 is rotated. Thus, the cutter 11 is lowered to the surface of the glass sheet ready to form the cutting line (D) thereon.

Thus, the cutter 11 is lowered on its arrival at the cutting line (B) (on the left side) to form the cutting line (D), while the cutters 10 continue to form the cutting lines (C) until said cutters 10 reach the cutting line (B) (on the left side). To be more precise, both the cutters 10 and the cutter 11 form cutting lines simultaneously for a short period of time (corresponding to the space between the shaft member 12 and the shaft member 13).

The mechanism of lowering the cutter 11 by the lever 16 will now be described in detail with reference to FIGS. 2 and 3.

The lever 16 is provided with a projecting piece 31 in its intermediate portion, a roller 32 being provided at the forward end of the projecting piece 31. Under the roller 32 pivoted by a pin 34 a turn lever 33 turns in association with the projecting piece 31. At the lower end of the turn lever 33 is provided with a roller 35, said roller 35 being pivoted by a pin or the like so as to be located inside an arcuate notch 36 provided on the side plate of the second carriage 5.

Thus, when the roller 35 is brought into contact with the first cam 29 during the travel of the second carriage 5 from the position (E) to the position (W), the roller 35 runs onto the cam 29, so that the lower part of the turn lever 33 is rotated counterclockwise about the pin 34. As a result, the upper part of the turn lever is also rotated counterclockwise thereby carrying the lever 16 against the spring 17 in the direction of (W). When the lower end of the lever 16 and the top of the rotary piece 21 are released from engagement, the rotary piece 21 is brought to a vertical position by the spring 24. Even when the spring 17 pulls the lever 16 in the direction of (E) as a result of disengagement of the roller 35 and the first cam 29, the lever 16 is prevented from returning to the position of engagement with the stopper 18 since the rotary piece 21 is kept in a vertical position, the lower end of the lever 16 engaging with the top of the rotary piece 21. Thus, the cutter 11 is lowered to form the cutting line (D) on the surface of the glass sheet as shown in FIG. 1.

After the cutter 11 has started to form the cutting line (D), the cutters 10 are raised as soon as they arrive at the cutting line (B) (on the left side) with the second carriage covering the space between the cutter 11 and the cutters 10.

The cutters 10 are raised as follows. When the projecting part 22 of the rotary piece 21 is brought into contact with a second cam 37 (FIG. 2) and runs onto it, the top of the rotary piece enters into the notch thereby disengaging the lever 15. As a result, the lever 15 is turned by the spring 17 to the position of engagement with the stopper 18, thus the cutters 10 is raised from the surface of the glass sheet to complete the cutting operation of the cutting lines (C).

When the cutter 11 has completed the cutting operation of the cutting line (D) on the surface of the glass sheet with the travel of the second carriage from the position (E) to the position (W), the lower projecting part of the rotary piece 21 engaged with the lever 16 of the cutter 11 runs onto a third cam 38, the engagement between the lever 16 and the rotary piece 21 is released so that the cutter 11 is raised.

The mechanism of raising and lowering the cutters 10, 11 from and to the surface of the glass sheet has heretofore been described with reference to the cams and the rotary pieces. However, the same effect can be achieved electrically, for example, by means of limit switches.

The function of the second carriage 5 and the cutters thereof 10, 11 have been mainly described with reference to FIGS. 1 to 6. Since the function of the first carriage travelling along the first rails and the first carriage cutters 8 is similar to the operation of the second carriage and the cutters 10, no description will be given here in order to avoid duplication.

The cutting apparatus according to the invention consisting of the construction as shown in FIGS. 1 to 5 will be described in greater detail hereafter.

The preferred embodiment of the invention is an apparatus designed to cut a large-sized glass sheet (A) into several smaller sheets of different sizes by means of cutters travelling longitudinally (S to N) and cutters 10, 11 travelling transversely (E to W).

A glass sheet (A) is securely placed on the table 1, the first carriage 4 being brought from N to S with its cutters 8 raised above the surface of the glass sheet. The second carriage 5 is kept in the position shown in FIG. 1. When the first carriage 4 is brought to the position (S), the lever 14 (FIG. 2) is brought into contact with the projecting axis 27, the lever 14 being turned against the spring 17. As a result, the rotary piece 21 is brought to a vertical position by its spring. When the first carriage 4 starts to travel from (S) toward (N), the lever 14 engages with the rotary piece thereby causing the cutter 8 to cut into the surface of the glass sheet, thus the cutting lines (B, B) is formed thereon by the cutters 8.

In the position in which the cutters 8 have completed the cutting operation of the cutting lines (B, B), the top of the rotary piece enters into the notch by a cam (not shown) provided on the first rail 2, so that the engagement between the lever 14 and the rotary piece is released. Since the lever 14 is caused to return to the position of the stopper by the spring 17, the cutters 8 are raised from the surface of the glass sheet (A). In this state, the first carriage 4 is returned to the position shown in FIG. 1.

Now, the second carriage 5 is brought from (W) to (E) with its cutters 10, 11 raised above the surface of the glass sheet. The second carriage 5 reaches the position (E) by overpassing the first carriage 4 kept in the position shown in FIG. 1. In the position (E), the projecting axis 27 is brought into contact with the lever 15 thereby causing said lever 15 to turn against the spring 17. As a result of this oscillation, the rotary piece 21 is brought to a vertical position by the spring 24. When the second carriage 5 starts to travel from (E) toward (W), the lever 15 engages with the rotary piece 21 thereby causing the cutters 10 to cut into the surface of the glass sheet (A), whereas the lever 16 is free from the projecting axis 27 and caused to engage with the stopper 18 by the spring 17, thus the cutter 11 is kept in a raised position above the surface of the glass sheet (A).

If the second carriage 5 is caused to travel from (E) to (W) in this state, the cutting lines (C) are formed on the surface of the glass sheet (A) by the cutters 10. Immediately before the cutters 10 reach the cutting line (B) (on the left side), or when the cutter 11 is positioned precisely above said cutting line (B), the cutter 11 is lowered onto the surface of the glass sheet by the action of the roller 35 associated with the lever 16 through the first cam 29 to start the cutting operation of the cutting line (D). Thus, both the cutters 10 and the cutter 11 form the cutting lines (C) and (D) simultaneously for a short period of time until the cutters 10 arrive at the cutting line (B) (that is, the space between the cutters 10 and the cutter 11).

When the cutters 10 reach the cutting line (B), the projecting part 22 of the rotary piece 21 engaging with the lever 16 runs onto the second cam 37 thereby rotating the top of the rotary piece into the notch 20, the lever 16 thus disengaged from the rotary piece 21 being returned to the position of the stopper 18, so that the cutters 10 are raised from the surface of the glass sheet and the cutting operation of the cutting lines (C) is completed.

As described hereinbefore, while the cutter 11 is forming the cutting line (D), the cutters 10 are raised above the surface of the glass sheet. When the second carriage travels to the position in which the cutter 11 has completed the cutting operation of the cutting line (D), the engagement between the lever 16 and the rotary piece 21 is released by a third cam 38 (FIG. 2) whereby the cutter 11 is raised and the cutting operation is completed.

The apparatus contemplated herein makes it possible to cut a large-sized glass sheet into a plurality of smaller sheets of different sizes along the cutting lines (B, C, D) by a single operation.

Second Embodiment

Figure 6:
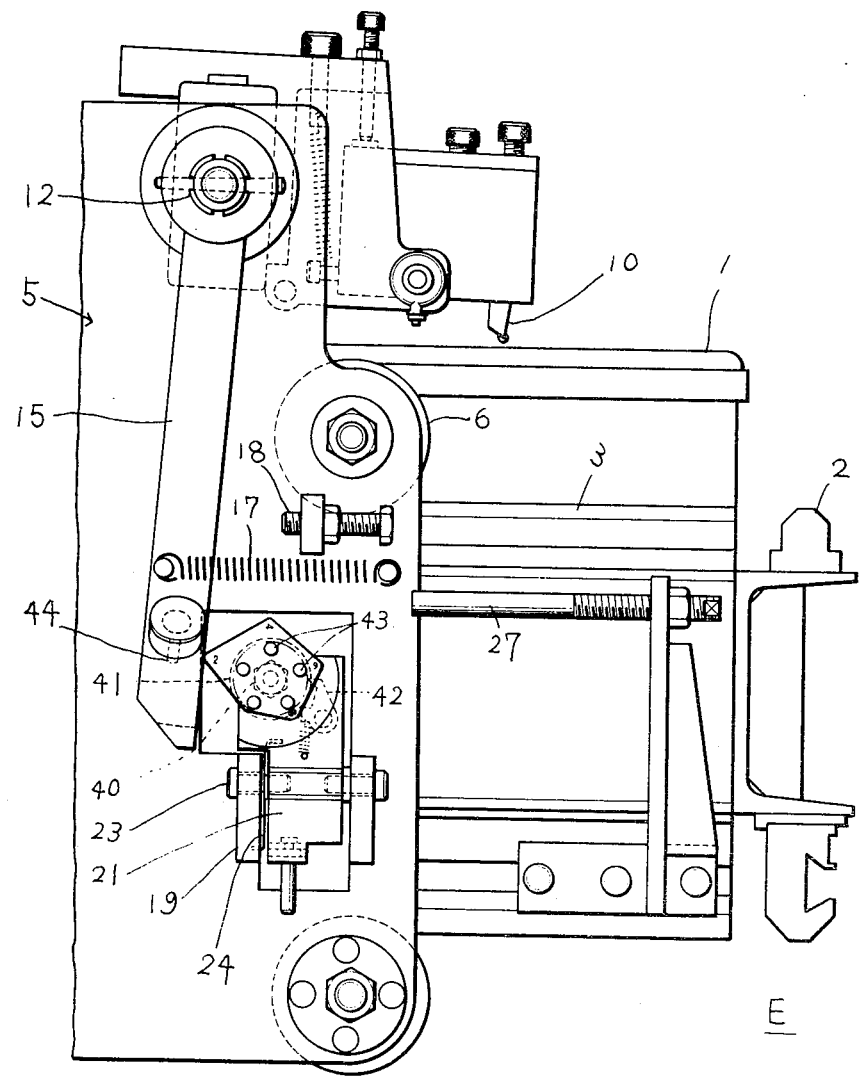
FIG. 6 is an elevational view, on a magnified scale, of another example of the carriage shown in FIG. 3, illustrating the state in which the cutter is lowered.
Figure 7:
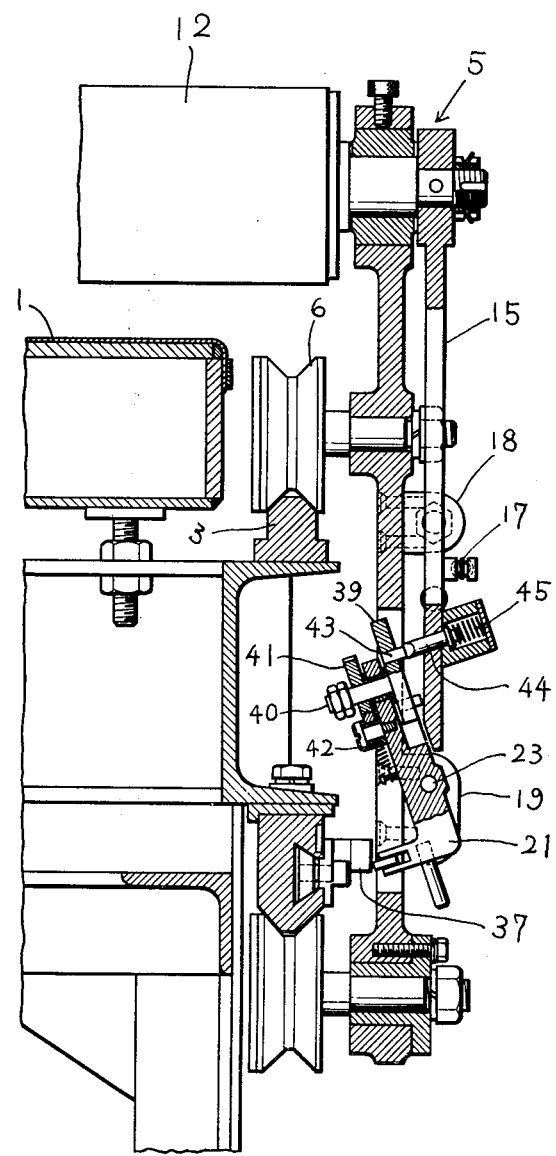
FIG. 7 is a side view of the same, illustrating the state in which the cutter is raised with the lever engaging with a stopper.

The embodiment shown in FIGS. 6 and 7 is different from the first embodiment in that it is a cutting apparatus which can form cutting lines on a large-sized glass sheet to obtain several sheets of different sizes, cutting lines being formed on a second glass sheet by superposing it on the first glass sheet, the same operation being conducted on succeeding sheets superposed one over the other in sequence.

The construction of the second embodiment is as that of the first embodiment except that the lever and the rotary piece engageable therewith are different in construction from those of the first embodiment. Hence, the same symbols for the same parts.

In the second embodiment, it is necessary that the cutters 8, 10, 11 should be raised by degree as glass sheets are superposed one over the other in sequence. To be more precise, a cam is provided on the rotary piece 21 engaging with each of the levers 14, 15, 16 so as to raise the positions of the cutters by degrees in accordance with the stepped increase of the glass sheets. The mechanism will be described in detail with reference to FIGS. 6 and 7 hereinunder.

A cam 39 (FIG. 7) is pivoted on an axle 40 in the upper part of the rotary piece engaging with the lever 15 of the second carriage 5. The cam 39 has a polygonal periphery (pentagonal in FIG. 6), each angularity being at a different distance from the axle 40. This distance differentiation enables the cam to raise the position of each cutter by degrees according as glass sheets are consecutively superposed one over the other on the table 1.

The axle 40 is provided with a ratchet 41 rotatable with the cam 39, a pawl 42 meshing with the ratchet 41 being pivoted on the rotary piece 21. The engagement between the ratchet 41 and the pawl 42 precludes the cam 39 from rotating in the direction of the longer distance (the larger angle) from the axle 40.

Pins 43 are located on the surface of the cam 39 each on the line connecting the projecting angle and the axle 40 and equally spaced therefrom. The lever 15 is provided at its lower end with a rectractible pin 44 with the interposition of a spring, said pin 44 is engageable with the pin 43 provided on the cam.

When the lever 15 is in engagement with the stopper 18, the pin 44 of said lever 15 engages with one of the pins 43 of the cam (the uppermost one of the five pins in FIG. 6).

When the second carriage 5 reaches the position (E) from the position (W), the lever 15 is brought into contact with the projecting rod 27, so that the lower end of the lever is turned clockwise against the spring 17. Since the pin 44 of the lever engages with one of the pins 43 of the cam 39, the lever causes the cam 39 to rotate by one graduation of the pins 43 when the lever is detached from the cam 39. When the lever has been detached from the cam 39, the lever is kept in a vertical position by the spring 24. Thus, even when the lever 15 is detached from the projecting rod 27 with the travel of the second carriage from (E) to (W), the lever 15 engages with the largest angle of the cam without engaging with the stopper 18 as shown in FIG. 6, so that cutting lines are formed on the surface of the first glass sheet placed on the table in the state in which the cutters 10 are lowered to their lowest positions.

Though not shown in the drawings, the lever 14 of the first carriage 4 and the lever 16 of the second carriage 5 are provided at their lower parts respectively with pins 44 engageable with pins 43 of cams 39 provided on rotary pieces 21 the same as in the case of the lever 15. The construction of the lever 16 of the second carriage 4 and the engagement thereof with cam 39 are the same as described relative to the first embodiment. To be more precise, as shown in FIG. 3, there are provided a projecting piece 31, a roller 32 at its forward end, a lever piece 33 engageable with the roller 32, a roller 35 of the lever piece, and an arcuate notch 36. Furthermore, there are provided a first cam 29 on the first rail and a first to a third cams 29, 37, 38 on the second rail. Thus, with the second embodiment it is possible to form the cutting lines (B, C, D) on the surface of the glass sheet (A) by the same process as in the case of the first embodiment.

In the second embodiment, the rotary pieces 21 are provided with cams 39, each cam 39 having angles of different sizes. Therefore, when the cutting lines (B, C, D) have been formed on the surface of a first glass sheet (A) by the cutters of the respective carriages 4, 5 and a second sheet is superposed thereon, each cutter can be lowered to its exact position for forming the cutting lines on the second glass sheet. The embodiment in FIGS. 6 and 7 is provided with a pentagonal cam 39 thereby making it possible to continue the cutting operation consecutively by superposing 5 glass sheets on the table one over the other in sequence.

Thus, if the angle of the cam is adjusted so as to coincide with the thickness of the glass sheet, several sheets of any thickness can be cut without interruption.

Third Embodiment

Figure 8:
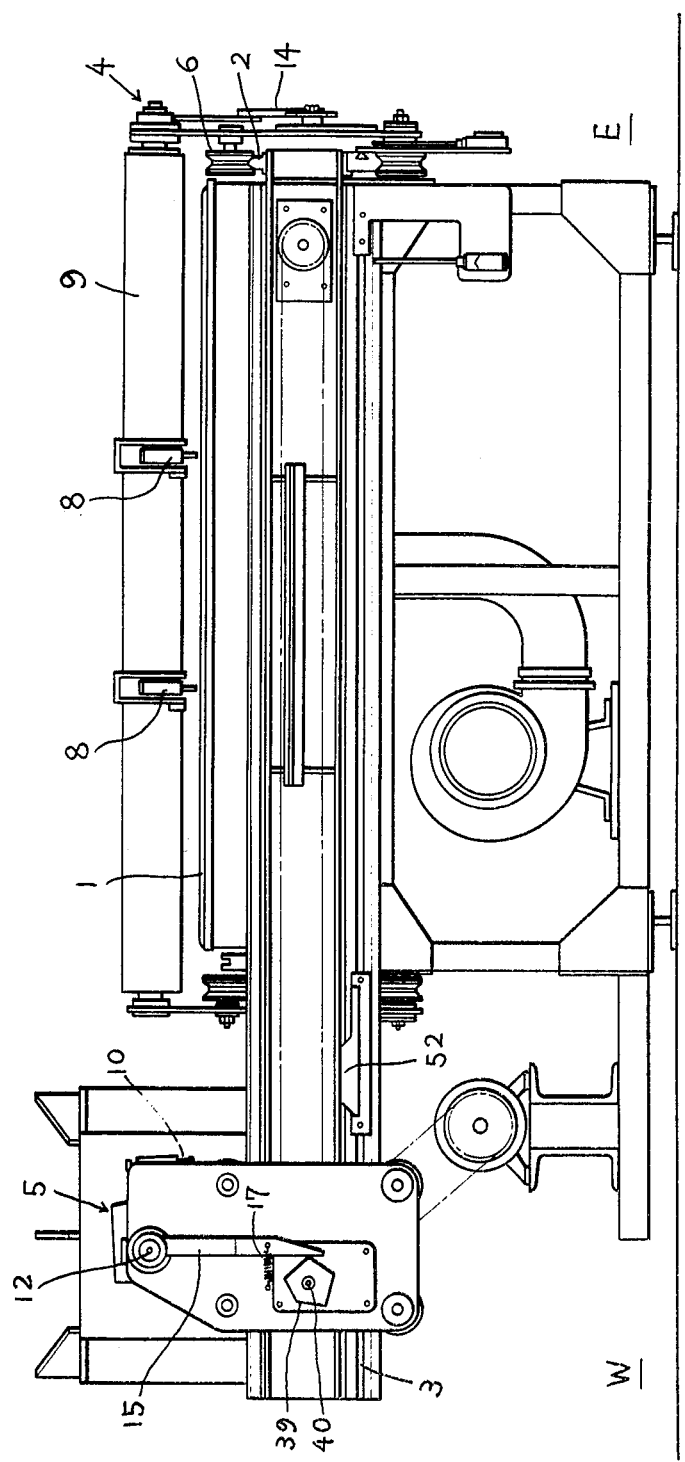
FIG. 8 is an elevational view showing another embodiment of the cutting apparatus of FIG. 2.
Figure 9:
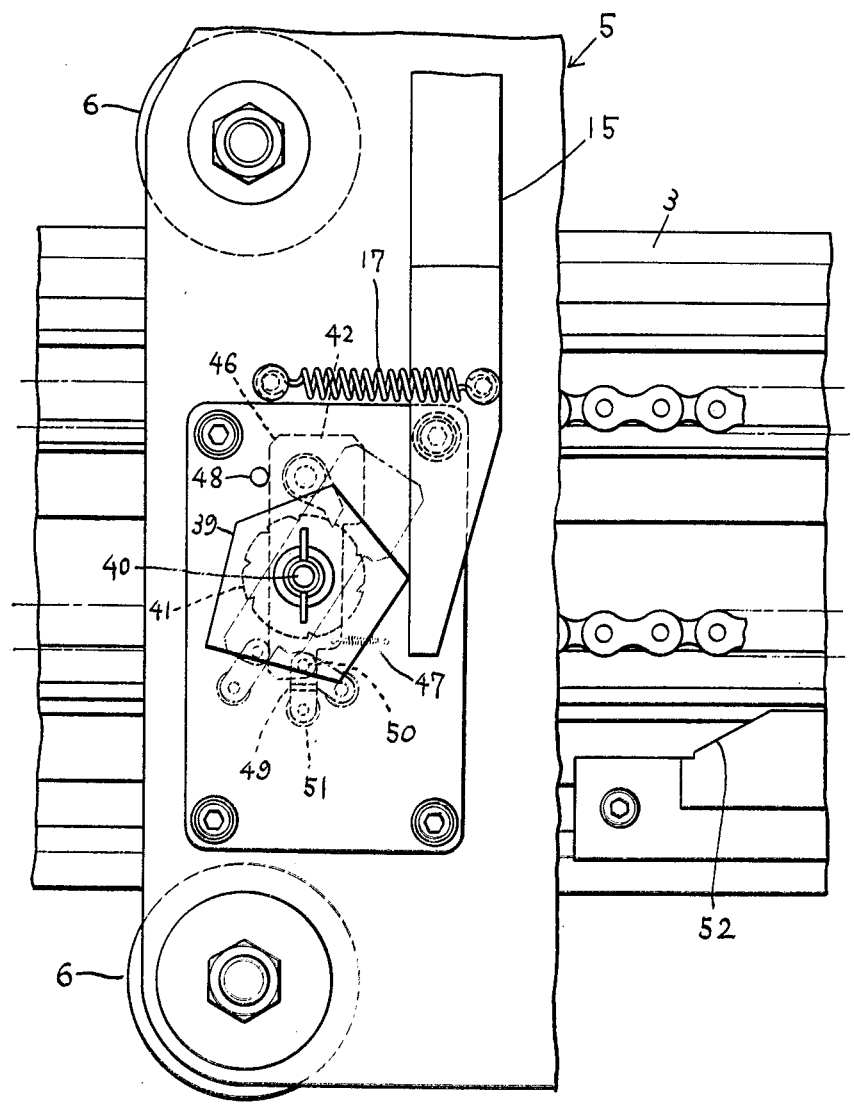
FIG. 9 is an elevational view, on a magnified scale, of the carriage of FIG. 8.
Figure 10:
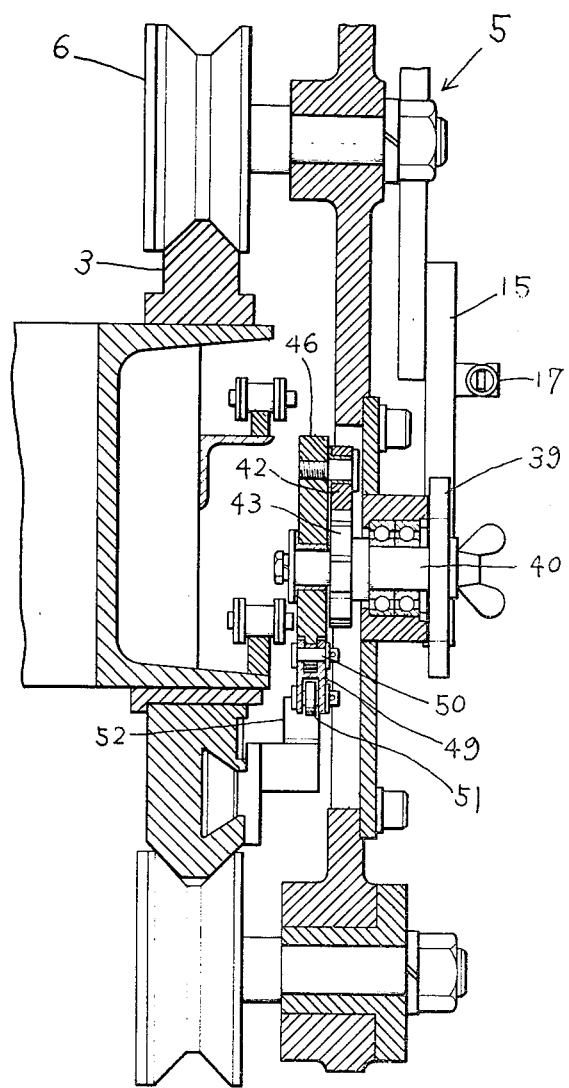
FIG. 10 is a side view of the same.

The embodiment shown in FIGS. 8 to 10 is a sheet glass cutting apparatus which can form cutting lines on a plurality of sheet consecutively by superposing them one over the other in sequence as in the case of the first embodiment.

In this embodiment, the first and the second carriages are caused to travel by means of a chain extended between sprockets driven by a motor. The second carriage has one shaft member 12 only, the shaft member 13 being omitted. Moreover, the rotary pieces 21 as described relative to the first and second embodiments are also omitted. The embodiment differs from the foregoing two embodiments in that the rotary pieces are replaced by plates capable of changing the angles of the levers 14, 15 so as to adjust the raised positions of the cutters 8, 10, respectively.

With reference to FIGS. 8 to 10, the lever 15 of the second carriage 5 is biased by the spring 17 in the direction in which the cutter 10 is lowered toward the surface of the glass sheet. The lever 15 engages with the cam 39 in the direction of pull of said spring.

The cam 39 is pivoted on an axle 40, a sprocket 41 being pivoted on the axle 40 on the inside of the cam 39. This embodiment differs from the second embodiment in that the cam 39 has no pin 43.

The numeral 46 designates a turning plate pivoted on the axle 40. As shown in FIG. 9, the plate 46 is normally in engagement in its upper part with a pin 48 on the opposite side biased by a spring 47. A pawl 42 is pivoted on the oscillating plate 46 so as to mesh with the sprocket 41. At the lower end of the plate 46, there is pivoted a projecting piece 49 on a pin 50, a roller 51 being provided at the lower end thereof.

The projecting piece 49, though freely rotatable counterclockwise about the pin 50, is adapted to turn together with the plate 46 in its clockwise movement. The numeral 52 designates a blocking member provided on the first and second rails, respectively. The blocking member 52 is provided in a position further advanced beyond the position in which each carriage has completed the cutting operation of cutting lines on the surface of the glass sheet, the blocking member 52 having a height sufficient to rotate the cam 39 by an equal angle with interposition of the pawl of the plate 46.

The cutting operation by the cutters of the second carriage will now described in detail. The description of the first carriage is omitted since it has the same construction as that of the second carriage.

Prior to the cutting operation, the second carriage 5 is kept in the position (E). The lever 15 is caused to engage with the smallest angle of the cam 39, so that the cutter 10 is set at a height suitable for forming cutting lines on the surface of a first glass sheet placed on the table.

The cutting lines are formed on the surface of the glass sheet by causing the second carriage to travel from (E) to (W). Before the second carriage comes to a stop in the position (W) after completing the cutting operation, the roller 51 of the plate 46 is brought into contact with the blocking member 52 provided on the second rail, the projecting piece 49 rotating counterclockwise on the pin 50 (FIG. 9) without causing rotation to the plate 46. Accordingly, the cutters 10 are still set at a height for forming cutting lines on the surface of the first glass sheet. When the second carriage travels from (W) toward (E), the roller 51 is brought into contact with the blocking member 52 thereby causing the projecting piece 49 to rotate clockwise in FIG. 9. With this rotation of the oscillating plate 46, the sprocket 41 meshing with the pawl 42 is rotated by one graduation thereby causing the lever 15 to engage with the second largest angle of the cam 39.

In FIG. 9, the cam 39 is pentagonal, the width of each angle from the axle 40 increasing by degrees. The cam 39 rotates from smaller angles toward larger angles making it possible to adjust the positions of the cutters in accordance with consecutive superposition of glass sheets one over the other.

While the second carriage 5 travels from (W) toward (E) after completing the cutting operation of cutting lines on the surface of a first glass sheet, the positions of the cutters are adjusted by the action of the blocking member 52 so as to be suitable for forming the cutting lines on the surface of a second glass sheet. In this state, the second carriage comes to a stop in the position (E).

Then, the second glass sheet is superposed on the first glass sheet already formed with the cutting lines, the cutting operation being repeated by causing the second carriage to travel from (E) to (W). By the same process, five glass sheets are formed with the cutting lines by superposing them one over the other in sequence while moving the second carriage between (W) and (E) consecutively.

With reference to this embodiment, though the description of the first carriage has been omitted, it is needless to mention that the cutting lines are formed by moving the first and the second carriage alternately in the same manner as in the case of the first embodiment. The first carriage is provided with levers and cams of the same construction as those of the second carriage.

Furthermore, this embodiment has pentagonal cams so as to form cutting lines on 5 glass sheets consecutively. It is to be understood that, by increasing the number of angles of the cam, glass sheets of the corresponding number can be formed with cutting lines consecutively.

Fourth Embodiment

This embodiment relates to the installing of the cutters for use in each of the aforementioned embodiments of the cutting apparatus. Heretofore, when a glass sheet was separated along the cutting lines formed by a cutter, jagged irregularities were formed on the cut faces. Conventionally, the cutter was rotatably mounted on a base member with bearings. This mounting method, however, was not capable of sustaining the edge of the cutter at right angles to the surface of a glass sheet to be cut. If the center line of the cutter passing through the edge is not perpendicular to the surface of the glass sheet to be cut, the cut line results in an asymmetric V-shaped cut (a cut having an asymmetric V-shaped cross-section). Thus, jagged irregularities arise on the cut faces when the glass sheet is separated along the cutting lines. These jagged irregularities have to be removed by the operation of polishing finish.

Figure 11:
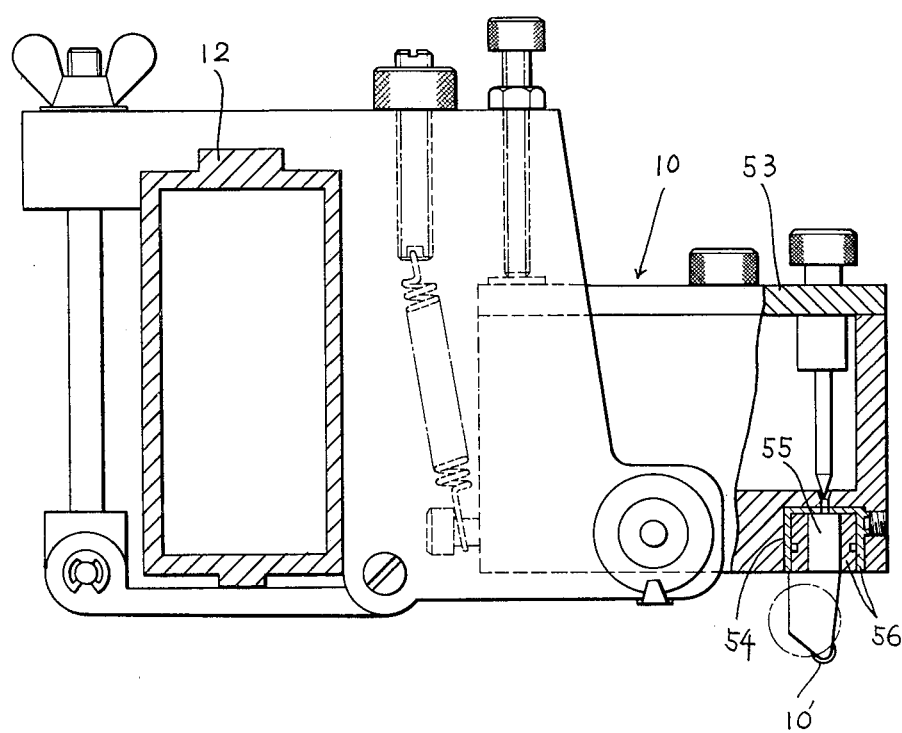
FIG. 11 is an elevational view, broken away in part, of another example of the cutter.

The cutter arrangement herein contemplated is used with the cutters of each embodiment herein described. FIG. 11 shows the arrangement with reference to the cutters 10 of the second carriage 5.

The cutters 10 are slidably secured onto the shaft member 12. The numeral 53 designates a base carriage and housing member of the cutter, a recessed hole 54 being provided on the underside of the forward end of the base member 53. The upper end of a shaft member 55 of the cutter having a rotatable cutting edge 10' is fitted into the recessed hole 54. The space between the inner periphery of the recessed hole 54 and the outer periphery and the top of the shaft member 55 is filled with elastic member 56, such as rubber and the like.

When cutting lines are formed on the surface of a glass sheet by the edge 10' of the cutter according to this embodiment, if the center line passing through the edge 10' is not perpendicular to the surface of the glass sheet, the shaft member 55 of the cutter compresses the elastic member 56 so as to attain this perpendicular position by satisfying said requirement. Since the V-shaped cross-section of the cutting line is symmetrical on both sides of the line perpendicular to the surface of the glass sheet, the cut faces are free from jagged irregularities when the glass sheet is cut apart. Thus, the polishing finish after the cutting operation is no longer necessary.

What is claimed is:

1. An apparatus for cutting sheet glass comprising in combination:
   (a) a table (1) for placing a glass sheet thereon;
   (b) a first and a second carriage (4, 5) adapted to travel along rails (2, 3) normal to each other, provided on longitudinally opposite sides and transversely opposite sides of the table;
   (c) a rotatable horizontal shaft member (9, 12, 13) connected to each of said carriages, said shaft member being capable of turning at least from a first to a second position and return;
   (d) cutters (8, 10, 11) secured to said shaft members (9, 12, 13) so as to be slidable therealong, said cutters being so disposed as to engage a glass sheet for cutting when said shaft is in said first position and removed from said glass sheet when said shaft is in said second position;
   (e) a lever (14, 15, 16) coupled at one end to said shaft member; and,
   (f) engaging means (19, 21, 25) for engaging and securing said lever and changing the angle thereof so as to turn said shaft between said first and second positions.

2. An apparatus as claimed in claim 1 further including a spring means (17) for normally holding said lever, and its associated shaft and cutter in the second position, a lower end to said lever which can be engaged by said engaging means for turning said lever against its spring bias to turn said shaft and its cutter to said first position.

3. An apparatus as claimed in claim 2, said engaging means including a pivoted rotary piece, with a notch and a retractible head which is in said notch and is projected beyond said notch.

4. An apparatus as claimed in claim 2, wherein, associated with one of said levers (16) is a stop (18) holding said lever (16) to a vertical position in conjunction with said spring means (17), a hook (31) on said lever (16), a lever member (33) pivoted at its center for engaging said hook (31) to move said lever against said spring bias to said first position, projecting means (21, 22) to engage said lever lower end and hold it in said first position, and, a projecting piece (27) on one of said rails to engage said lever member (33) when the carriage whose shaft is coupled to said lever (16) reaches a predetermined position.

5. An apparatus as claimed in claim 2, wherein said engaging means includes a polygonal rotating cam (39), locking means (43, 44) for locking said cam at predetermined positions, said cam (39) having stepwise increasing sides and rotating on a center axle (40), said side joining to form points at positions increasing in distance from said center axle (40) which points engage said lever so that said first position can gradually be raised to accommodate additional sheets of glass, by changing the position of the cam which contacts said lever lower end.

6. An apparatus as claimed in claim 1 wherein said cutters each have a cutter base carriage and housing member (53) with a bottom side forward end having a recessed portion (54) in said forward end; a cutter shaft (55) with an upper and lower end, the upper shaft end being disposed in said recessed portion (54), the outer periphery of said upper end being less than the inner periphery of said recess, a cutter (10) on said cutter shaft lower end with a rotatable cutter edge (10'), and, resilient packing means interposed between said shaft outer periphery and said recess inner periphery.

7. An apparatus as claimed in claim 1, wherein said engaging means include a recess and a projecting piece (19) adjacent said lever, a rotary piece (21) rotatably pivoted between said projecting (19), a projecting part (22) on said rotary piece (21), said rotary piece being kept in said recess by said lever, resilient means (24) tending to maintain said rotary piece (21) in contact with said lever at a predetermined position, a projection on at least one of said rails designed to engage said lever and move said lever away from keeping said rotary piece in said recess so that said resilient means (24) can bring said rotary piece out of said recess to engage said lever and maintain said lever in a position where said shaft is turned to said first position.

* * * * *